United States Patent
Horikawa (10) Patent No.: US 8,407,810 B2
(45) Date of Patent: Mar. 26, 2013

(54) KVM SWITCH, INFORMATION PROCESSING APPARATUS, AND COMPUTER READABLE RECORDING MEDIUM

(75) Inventor: Masaki Horikawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 877 days.

(21) Appl. No.: 12/219,632

(22) Filed: Jul. 24, 2008

(65) Prior Publication Data

US 2009/0031417 A1    Jan. 29, 2009

(30) Foreign Application Priority Data

Jul. 27, 2007 (JP) ................ 2007-196753

(51) Int. Cl.
*G06F 15/17* (2006.01)
*G06F 3/02* (2006.01)

(52) U.S. Cl. ........................... 726/34; 713/182

(58) Field of Classification Search ............ None
See application file for complete search history.

(56) References Cited

U.S. PATENT DOCUMENTS

| 7,284,278 | B2 * | 10/2007 | Anson et al. ............. 726/34 |
| 2005/0060580 | A1 * | 3/2005 | Chebolu et al. ........... 713/201 |
| 2005/0149738 | A1 * | 7/2005 | Targosky ............... 713/182 |
| 2005/0259654 | A1 * | 11/2005 | Faulk, Jr. ................ 370/392 |
| 2007/0214499 | A1 * | 9/2007 | Clymer et al. .............. 726/4 |
| 2009/0222670 | A1 * | 9/2009 | Mehta et al. ............ 713/186 |

FOREIGN PATENT DOCUMENTS

| JP | 9-244760 | 9/1997 |
| JP | 2003-280781 | 10/2003 |
| JP | 2006-33206 | 2/2006 |
| JP | 2006-72962 | 3/2006 |

* cited by examiner

*Primary Examiner* — Venkat Perungavoor (74) *Attorney, Agent, or Firm* — Staas & Halsey LLP (57) ABSTRACT

A KVM switch is connectable to a plurality of information processing apparatus and a plurality of consoles used for operating the plurality of information processing apparatus. A storing portion stores first user-limiting information which defines access permission or access no-permission to each information processing apparatus for each user. An acquiring portion acquires second user-limiting information which defines access permission or access no-permission to each information processing apparatus for each user, from each information processing apparatus. A controlling portion controls access to each information processing apparatus for each user based on the first user-limiting information and the second user-limiting information.

14 Claims, 4 Drawing Sheets

|  | LOGIN USER INFORMATION | | |
|---|---|---|---|
|  | ADMINISTRATION USER | ACCESS-LIMITED USER | ACCESS-UNLIMITED USER |
| SERVER1 | a001 | a006~a010 | a001~a005 |
| SERVER2 | a001 | – | a001~a010 |
| ⋮ | ⋮ | ⋮ | ⋮ |
| SERVER N | a001 | a004-a010 | a001~a003 |

FIG. 2B

| CONSOLE USAGE USER INFORMATION | | | | |
|---|---|---|---|---|
| USER ID | SERVER1 | SERVER2 | ⋯ | SERVER N |
| a001 | ○ | ○ | ⋯ | ○ |
| a002 | × | ○ | ⋯ | ○ |
| a003 | ○ | × | ⋯ | ○ |
| a004 | × | ○ | ⋯ | × |
| a005 | ○ | × | ⋯ | × |
| a006 | × | × | ⋯ | × |
| ⋮ | ⋮ | ⋮ | ⋮ | ⋮ |

○ : ACCESS TO SERVER IS PERMITTED

× : NO ACCESS TO SERVER IS PERMITTED

FIG. 3

KVM SWITCH, INFORMATION PROCESSING APPARATUS, AND COMPUTER READABLE RECORDING MEDIUM

CROSS-REFERENCE TO RELATED APPLICATIONS

The Present application is based on Japanese Patent Application No. 2007-196753 filed Jul. 27, 2007, the entire disclosure of which is hereby incorporated by reference.

BACKGROUND OF THE INVENTION

1. Field of the Invention

The present invention relates to a KVM switch which can be used to switch a plurality of computers, as well as an information processing apparatus, and a computer readable recording medium.

2. Description of the Related Art

Conventionally, there has been known a KVM switch connected between a plurality of computers (see e.g. Japanese Patent Application Publication No. 2006-72962).

Moreover, conventionally, there has been known a computer which authenticates a user or a request based on preset information (see e.g. Japanese Patent Application Publication Nos. 9-244760, 2006-33206, and 2003-280781). Such a server or a computer includes a user-limiting function, and an administration user and a user to be limited can be set in the server or the computer.

However, the limitation of the user included in the present KVM switch is performed for the user of the KVM switch and the server or the computer as an object of operation. Therefore, the limitation of the user by login user information on the server or the computer is not performed, so that the user-limiting function of the server or the computer has not been utilized sufficiently.

Thus, when the user-limiting function of the server or the computer is not utilized, and a user uses a computer connected to the KVM switch, for example, another user can access the computer via the KVM switch. As a result, there is a fear that information leaks.

SUMMARY OF THE INVENTION

It is an object of the present invention to provide a KVM switch and a computer readable recording medium capable of utilizing a user-limiting function included in an information processing apparatus. It is another object of the present invention to provide an information processing apparatus and a computer readable recording medium capable of utilizing a user-limiting function included in a KVM switch.

According to a first aspect of the present invention, there is provided a KVM switch connectable to a plurality of information processing apparatus and a plurality of consoles used for operating the plurality of information processing apparatus, including: a storing portion that stores first user-limiting information which defines access permission or access no-permission to each information processing apparatus for each user; an acquiring portion that acquires second user-limiting information which defines access permission or access no-permission to each information processing apparatus for each user, from each information processing apparatus; and a controlling portion that controls access to each information processing apparatus for each user based on the first user-limiting information and the second user-limiting information.

With the above arrangement, the access to each information processing apparatus for each user is controlled based on the first user-limiting information stored in the storing portion and the second user-limiting information acquired from each information processing apparatus. Therefore, it is capable of utilizing a user-limiting function included in each information processing apparatus.

Preferably, the KVM switch further comprises an informing portion that informs a user to whom access to the information processing apparatus is limited by the controlling portion of information which shows that the access to the information processing apparatus is limited.

With the above arrangement, the user can know that the access to the information processing apparatus is limited.

Preferably, the controlling portion performs a setting to receive operation data from the console used by the user who is permitted to access the information processing apparatus, and a setting to not receive the operation data from the console used by the user who is not permitted to access the information processing apparatus.

With the above arrangement, it is possible to prevent leakage of information.

Preferably, the KVM switch further comprises a first interface that is connected to each information processing apparatus and is used to communicate data for the console, and a second interface that is used to communicate a command of an application included in each information processing apparatus, wherein each information processing apparatus includes a driver program for transmitting the second user-limiting information to the KVM switch via the first interface or the second interface.

With the above arrangement, the second user-limiting information can be acquired from each information processing apparatus by using any one of the first interface that is used to communicate data for the console, and the second interface that is used to communicate the command of the application.

Preferably, the first user-limiting information is capable of being set from the plurality of the consoles or the information processing apparatus connected via a network.

With the above arrangement, the first user-limiting information can be set to the storing portion via the plurality of the consoles connected to the KVM switch or the information processing apparatus connected via the network.

According to a second aspect of the present invention, there is provided a computer readable recording medium causing a KVM switch to execute a process, the KVM switch being connectable to a plurality of information processing apparatus and a plurality of consoles used for operating the plurality of information processing apparatus, the process comprising: storing first user-limiting information which defines access permission or access no-permission to each information processing apparatus for each user; acquiring second user-limiting information which defines access permission or access no-permission to each information processing apparatus for each user, from each information processing apparatus; and controlling access to each information processing apparatus for each user based on the first user-limiting information and the second user-limiting information.

With the above arrangement, the access to each information processing apparatus for each user is controlled based on the first user-limiting information stored in the storing portion and the second user-limiting information acquired from each information processing apparatus. Therefore, it is capable of utilizing a user-limiting function included in each information processing apparatus.

According to a third aspect of the present invention, there is provided an information processing apparatus which is connected to a KVM switch connectable to a plurality of consoles, including: an acquiring portion that acquires first user-limiting information which defines access permission or access no-permission to the information processing apparatus for each user, from the KVM switch; a storing portion that stores second user-limiting information which defines access permission or access no-permission to the information processing apparatus for each user; and a controlling portion that controls access to the information processing apparatus for each user based on the first user-limiting information and the second user-limiting information.

With the above arrangement, the access to the information processing apparatus for each user is controlled based on the first user-limiting information acquired from the KVM switch and the second user-limiting information stored in the storing portion. Therefore, it is capable of utilizing a user-limiting function included in the KVM switch.

Preferably, the information processing apparatus further comprises an informing portion that informs a user to whom access to the information processing apparatus is limited by the controlling portion of information which shows that the access to the information processing apparatus is limited.

With the above arrangement, the user can know that the access to the information processing apparatus is limited.

Preferably, the controlling portion performs a setting to receive operation data from the console used by the user who is permitted to access the information processing apparatus, and a setting to not receive the operation data from the console used by the user who is not permitted to access the information processing apparatus.

With the above arrangement, it is possible to prevent leakage of information.

Preferably, the information processing apparatus further comprises a first interface that is connected to the KVM switch and is used to communicate data for the console, and a second interface that is used to communicate a command of an application included in the information processing apparatus, wherein the acquiring portion that acquires first user-limiting information via the first interface or the second interface.

With the above arrangement, the information processing apparatus can acquire the first user-limiting information from the KVM switch by using the first interface that is used to communicate data for the console, and the second interface that is used to communicate the command of the application.

According to a fourth aspect of the present invention, there is provided a computer readable recording medium causing an information processing apparatus to execute a process, the information processing apparatus being connected to a KVM switch connectable to a plurality of consoles, the process comprising: acquiring first user-limiting information which defines access permission or access no-permission to the information processing apparatus for each user, from the KVM switch; storing second user-limiting information which defines access permission or access no-permission to the information processing apparatus for each user; and controlling access to the information processing apparatus for each user based on the first user-limiting information and the second user-limiting information.

With the above arrangement, the access to the information processing apparatus for each user is controlled based on the first user-limiting information acquired from the KVM switch and the second user-limiting information stored in the storing portion. Therefore, it is capable of utilizing a user-limiting function included in the KVM switch.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of an embodiment of the present invention.

Figure 1:
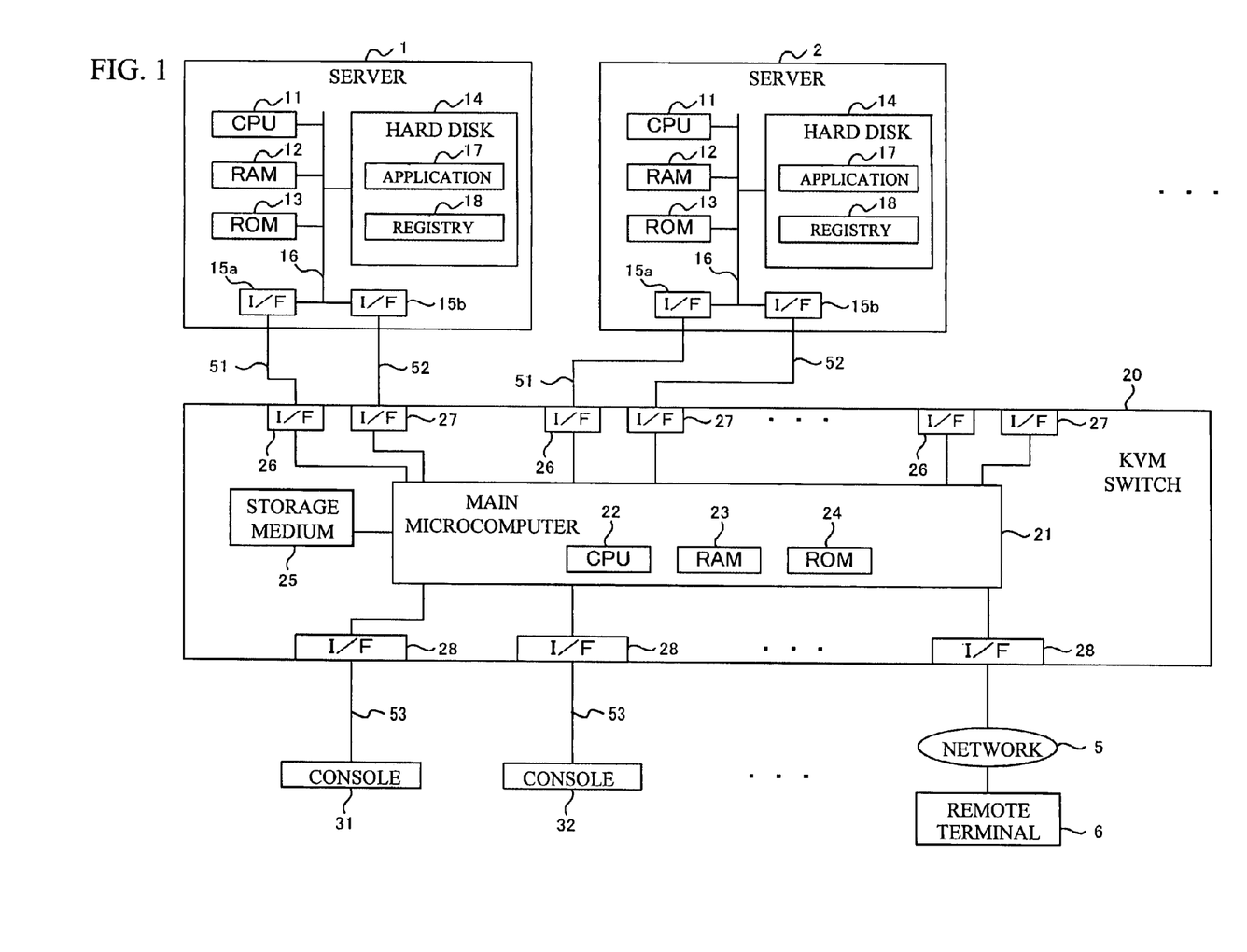
FIG. 1 is a block diagram showing the construction of a system including a KVM switch according to an embodiment of the present invention.

FIG. 1 is a block diagram showing the construction of a system including a KVM (K: keyboard, V: video, M: mouse) switch according to the embodiment of the present invention.

The system in FIG. 1 is provided with servers 1 and 2, a KVM switch, and consoles 31 and 32.

Each of the consoles 31 and 32 is a sets of input/output devices used for operating each of the servers, and is composed of an input device such as a keyboard and a pointing device, and a monitor.

The server 1 includes a CPU 11 that controls the entire server, a RAM 12 that functions as a working area, a ROM 13 that stores a control program, a hard disk drive (HDD) 14 that includes various kinds of information and various programs, an interface (I/F) 15a that communicates with each of the consoles via the KVM switch, and an interface (I/F) 15b that is only used for application command communication. The CPU 11 is connected to the RAM 12, the ROM 13, the HDD 14, and interfaces (I/Fs) 15a and 15b via a system bus 16. The sever 2 has the same construction as the server 1, and description thereof is omitted.

Figure 2A:
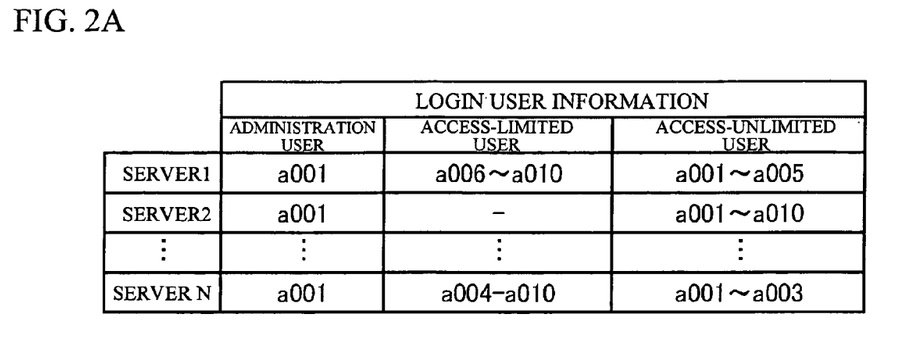
FIG. 2A is a diagram showing an example of a list of login user information.

The HDD 14 is comprised of an application 17, and a registry 18 which stores login user information (second user-limiting information). The login user information includes information such as a user ID, an administration user, an access-limited user, an access-unlimited user. FIG. 2A shows an example of a list of the login user information. The HDD 14 includes a driver program for transmitting the login user information to the KVM switch 20 via the I/F 15a or the I/F 15b.

The I/F 15a includes a USB (Universal Serial Bus) terminal or a serial terminal, and is connected to the KVM switch 20 via a USB (Universal Serial Bus) cable or a serial cable. The I/F 15b includes a USB (Universal Serial Bus) terminal or a serial terminal, and is connected to the KVM switch 20 via a cable 52 indicative of a USB (Universal Serial Bus) cable or a serial cable.

Figure 2B:
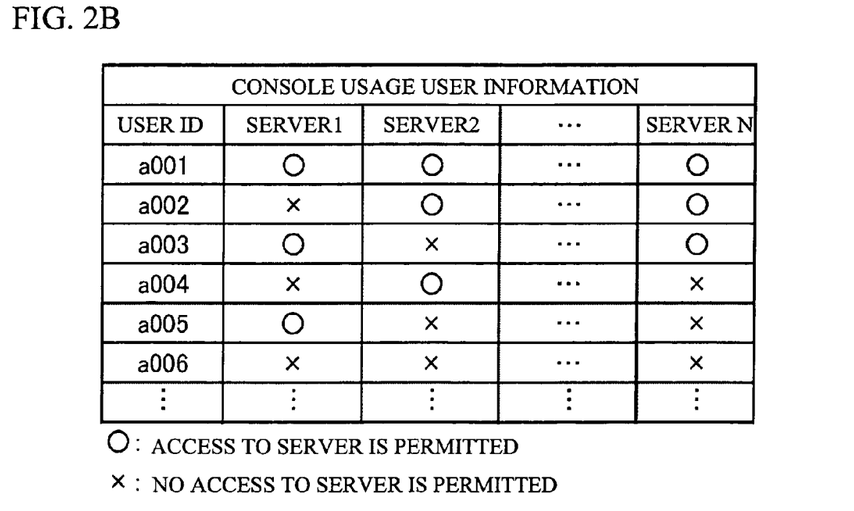
FIG. 2B is a diagram showing an example of console usage user information.

The KVM switch 20 is provided with a main microcomputer 21, a storage medium 25, and a plurality of interfaces (I/Fs) 26 to 28. The main microcomputer 21 is provided with a CPU 22 that controls the entire KVM switch, a RAM 23 that functions as a working area, and a ROM 24 that stores a control program. FIG. 2B shows an example of the console usage user information.

Each of the I/Fs 26 includes a USB (Universal Serial Bus) terminal or a serial terminal, and is connected to the IF 15a of each server via a cable 51. Each of the IFs 27 includes a USB (Universal Serial Bus) terminal or a serial terminal, and is connected to the I/F 15b of each server via a cable 52. Each of the I/Fs 26 is used to communicate data for the console, and each of the I/Fs 27 is used to communicate a command of an application included in each server. Each of the I/Fs 28 includes a USB (Universal Serial Bus) terminal or a serial terminal, and is connected to each console via a cable 53. Moreover, each of the I/Fs 28 includes a network port, and is connected to a remote terminal 6 such as a computer via a network 5.

The console usage user information stored in the storage medium 25 is displayed on a monitor included in an arbitrary console, and is set via the input device or is set by the remote terminal 6 (e.g. a computer) via the network 5. Thus, a function to display information on the monitor, and to adjust or to set the information is called an OSD (On-Screen Display) function. Then, a function to adjust or to set the information from a screen displayed on the monitor of the remote terminal 6 is called an IP-KVM setting function. That is, the console usage user information is set by using the OSD (On-Screen Display) function or the IP-KVM setting function. The information of the screen displayed on the monitor of the remote terminal 6 is formed with a HTML type. When the information of the HTML type is adjusted or set on the monitor, the information is transmitted to the KVM switch 20.

Figure 3:
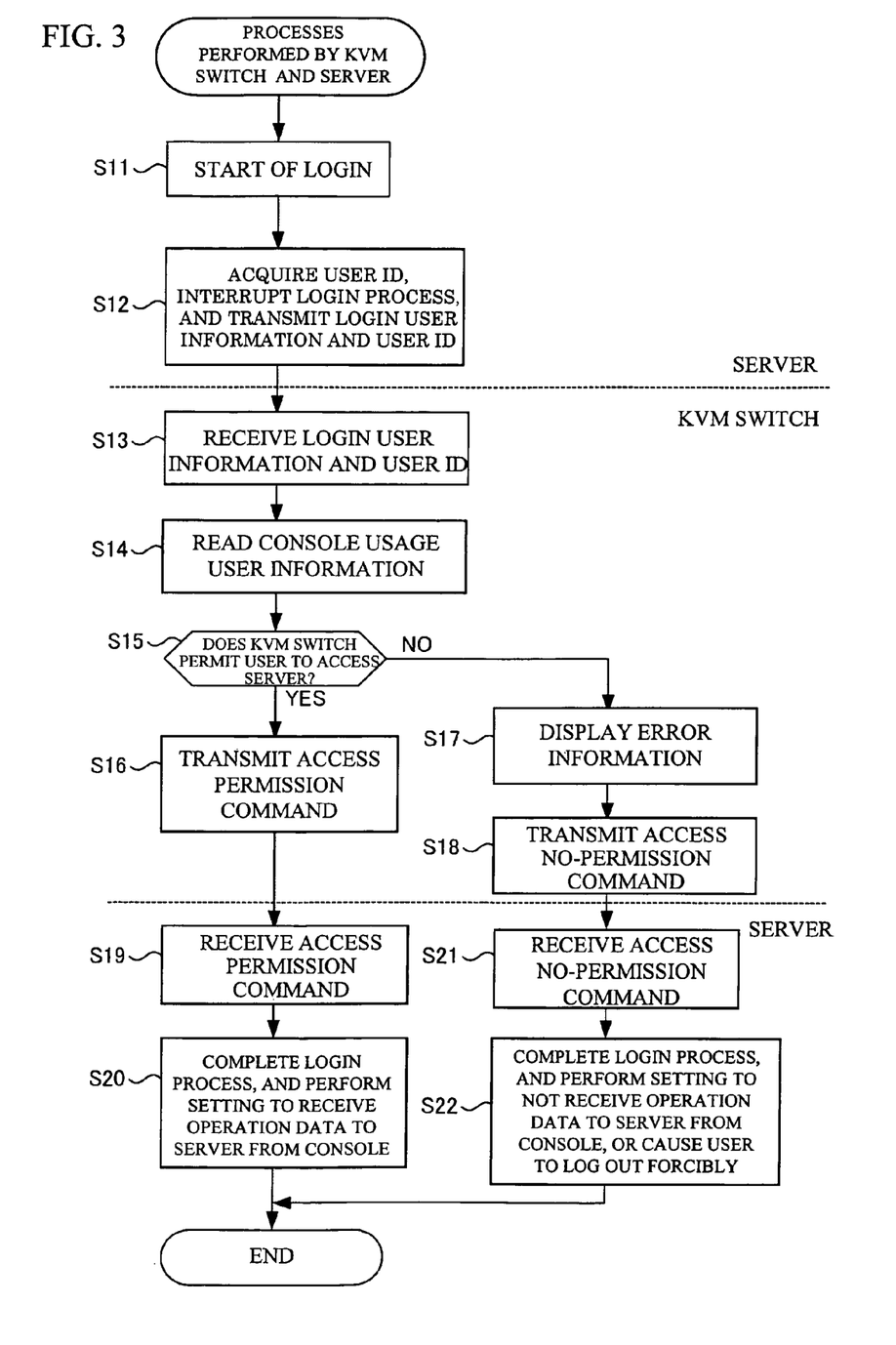
FIG. 3 is a flowchart showing processes performed by a KVM switch 20 and a server 1.

FIG. 3 is a flowchart showing processes performed by the KVM switch 20 and the server 1, and specially shows a determination process performed by the KVM switch 20. Here, a description will now be given of a case in which the user logs in the server 1.

First, the user starts the login to the server 1 via the KVM switch 20 (step S11), and the CPU 11 of the server 1 acquires the user ID, interrupts a login process, and transmits the login user information and the user ID stored in the registry 18 to the KVM switch 20 via the I/F 15a or the I/F 15b (step S12).

The I/F 26 or the I/F 27 of the KVM switch 20 receives the login user information and the user ID (step S13). Thus, By using any one of the I/F 26 and the I/F 27, the login user information can be acquired.

The main microcomputer 21 reads the console usage user information from the storage medium 25 (step S14), and determines whether to permit the user to access the server 1 based on the user ID, the login user information received by the I/F 26 or the I/F 27, and the console usage user information read from the storage medium 25 (step S15). In this case, when the user ID used to log in the server 1 is permitted to access the server 1 in the console usage user information and is the access-unlimited user in the login user information, the main microcomputer 21 permits the user to access the server 1. On the other hand, when the user ID used to log in the server 1 is not permitted to access the server 1 in the console usage user information or is the access-limited user in the login user information, the main microcomputer 21 does not permit the user to access the server 1.

When the answer to the determination of step S15 is "YES", the main microcomputer 21 transmits an access permission command to the CPU 11 of the server 1 via the I/F 26 or the I/F 27 (step S16). The CPU 11 of the server 1 receives the access permission command (step S19). Further, the CPU 11 of the server 1 completes the login process, and performs a setting to receive operation data from the console used by the user (step S20). The present process is completed.

On the other hand, when the answer to the determination of step S15 is "NO", the main microcomputer 21 causes the monitor included in the console used by the user to display error information which shows that the access to the server is limited by using the OSD function, or causes the monitor of the remote terminal 6 used by the user to display the error information by using the IP-KVM function (step S17). The error information displayed on the monitor of the remote terminal 6 is formed with the HTML type. On the monitor included in the console used by the user or the monitor of the remote terminal 6 used by the user, screen data from the server 1 is not displayed, and only the error information transmitted from the main microcomputer 21 is displayed. For example, the error information is a message such as "Access to server 1 is limited".

Next, the main microcomputer 21 transmits an access no-permission command to the CPU 11 of the server 1 via the I/F 26 or the I/F 27 (step S18). The CPU 11 of the server 1 receives the access no-permission command (step S21). Further, the CPU 11 of the server 1 completes the login process, and performs a setting to not receive operation data from the console used by the user, or causes the user to log out forcibly (step S22). The present process is completed.

Figure 4:
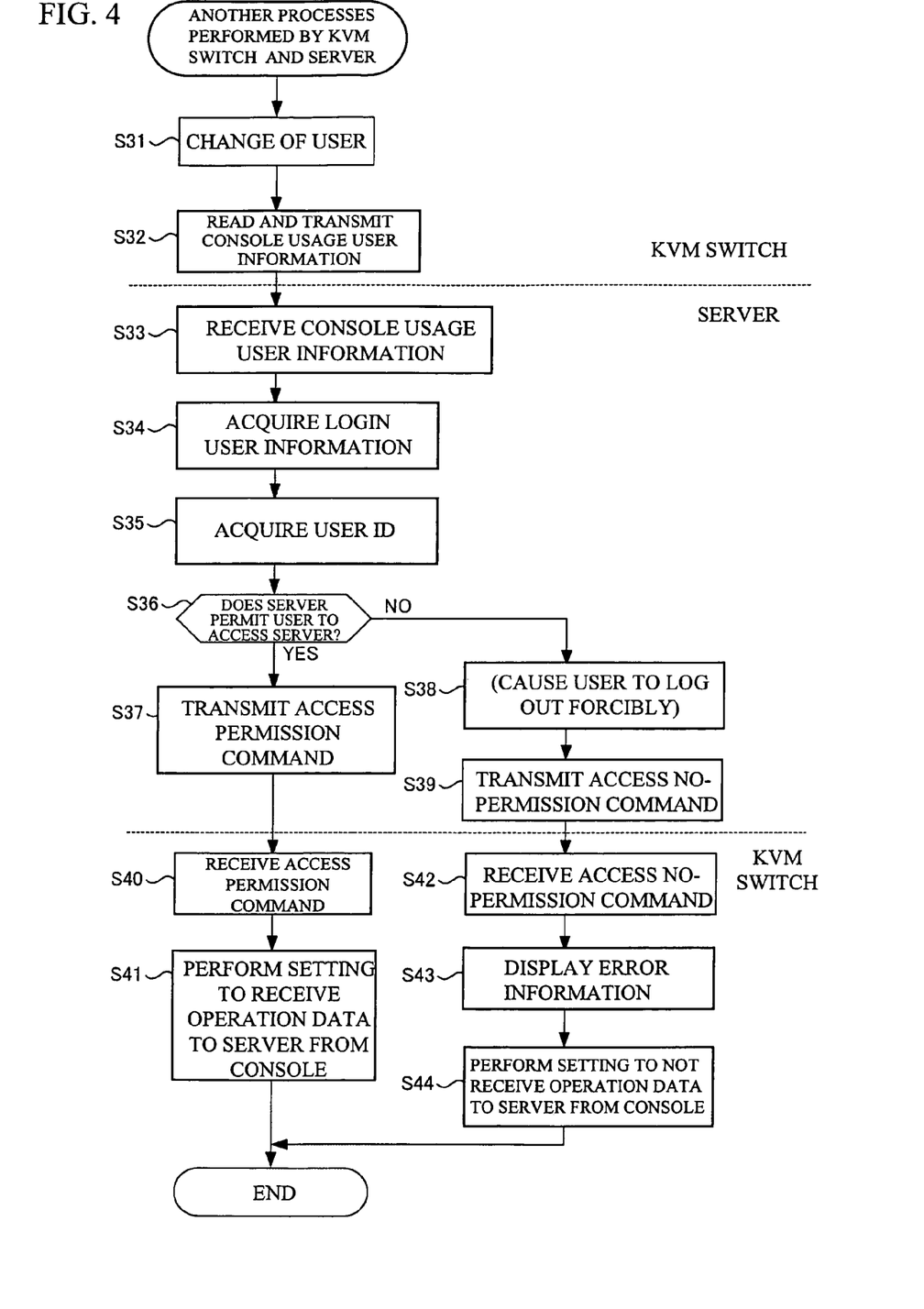
FIG. 4 is a flowchart showing another processes performed by the KVM switch 20 and the server 1.

FIG. 4 is a flowchart showing another processes performed by the KVM switch 20 and the server 1, and specially shows a determination process performed by the server 1. It should be noted that the same process as the determination process is also performed by another server.

First, the user using the console is changed to another user (step S31). Then, the main microcomputer 21 of the KVM switch 20 reads the console usage user information from the storage medium 25, and transmits the console usage user information to the server 1 via the I/F 26 or the I/F 27 (step S32).

The CPU 11 of the server 11 receives the console usage user information via the I/F 15a or the I/F 15b (step S33). Thus, by using any one of the I/F 15a and the I/F 15b, the console usage user information can be acquired from the KVM switch 20.

The CPU 11 of the server 11 acquires the login user information stored in the registry 18 (step S34). Further, the CPU 11 of the server 11 acquires the user ID from the console via the KVM switch 20 (step S35).

Next, the CPU 11 determines whether to permit the user to access the server 1 based on the user ID, the login user information, and the console usage user information (step S36). In this case, when the acquired user ID is permitted to access the server 1 in the console usage user information and is the access-unlimited user in the login user information, the CPU 11 permits the user to access the server 1. On the other hand, when the acquired user ID is not permitted to access the server 1 in the console usage user information or is the access-limited user in the login user information, the CPU 11 does not permit the user to access the server 1.

When the answer to the determination of step S16 is "YES", the CPU 11 transmits an access permission command to the main microcomputer 21 of the KVM switch 20 via the I/F 15a or the I/F 15b (step S37). The main microcomputer 21 receives the access permission command (step S40), and performs a setting to receive operation data from the console used by the user (step S41). The present process is completed.

On the other hand, when the answer to the determination of step S36 is "NO", the CPU 11 causes the user to log out forcibly (step S38), and transmits an access no-permission command to the main microcomputer 21 of the KVM switch 20 via the I/F 15a or the I/F 15b (step S39). The procedure of step S38 is an option, and is performed when a server administrator sets the procedure of step S38 to the server 1.

The main microcomputer 21 receives the access no-permission command (step S42). Then, the main microcomputer 21 causes the monitor included in the console used by the user to display error information by using the OSD function, or causes the monitor of the remote terminal 6 used by the user to display the error information by using the IP-KVM function (step S43). The error information displayed on the monitor of the remote terminal 6 is formed with the HTML type. On the monitor included in the console used by the user or the monitor of the remote terminal 6 used by the user, screen data from the server 1 is not displayed, and only the error information transmitted from the main microcomputer 21 is displayed. For example, the error information is a message such as "Access to server 1 is limited".

Then, the main microcomputer 21 performs a setting to not receive operation data from the console used by the user (step S44). The present process is completed.

In the above-mentioned processes of FIG. 3, the KVM switch 20 may perform the procedures of steps S40 and S41 in FIG. 4 on behalf of the procedures of steps S19 and S20, and further the procedures of steps S42 and S44 in FIG. 4 on behalf of the procedures of steps S21 and S22. With this construction, the procedures after step S13 are collectively performed with the KVM switch, so that the processing time of the entire system can shorten.

In the above-mentioned processes of FIG. 4, the server 1 may perform the procedures of steps S19 and S20 in FIG. 3 on behalf of the procedures of steps S40 and S41, and further the procedures of steps S21, S17 and S22 in FIG. 3 on behalf of the procedures of steps S42 to S44. With this construction, the procedures after step S63 are collectively performed with the server 1, so that the processing time of the entire system can shorten. In this case, in step S17, the server 1 informs the user of the error information which shows that the access to the server 1 is limited. Therefore, the user can know that the access to the server 1 is limited.

As described in detail above, according to the embodiment of the present invention, the storage medium 25 of the KVM switch 20 stores the console usage user information which defines the access permission or the access no-permission to each server for each user. The main microcomputer 21 of the KVM switch 20 acquires from each server the login user information which defines the access permission or the access no-permission to each server for each user, and controls the access to each server for each user based on the console usage user information and the login user information. Therefore, the KVM switch 20 is capable of utilizing a user-limiting function included in each server.

Since, by using the OSD function or the IP-KVM function, the main microcomputer 21 informs the user of the error information which shows that the access to the server is limited (see step S17), the user can know that the access to the server is limited.

The main microcomputer 21 performs the setting to receive the operation data from the console used by the user who is permitted to access the server, and the setting to not receive the operation data from the console used by the user who is not permitted to access the server (see steps S41 and S44). It is therefore possible to prevent leakage of information.

The CPU 11 of the server 1 acquires the console usage user information which defines the access permission or the access no-permission to the server 1 for each user, and the registry 18 stores login user information which defines the access permission or the access no-permission to the server 1 for each user. The CPU 11 of the server 1 controls the access to the server 1 for each user based on the console usage user information and the login user information. Therefore, the server 1 is capable of utilizing a user-limiting function included in the KVM switch 20. It should be noted that another server can also provide the same effects as the server 1.

The CPU 11 of the server 1 performs the setting to receive the operation data from the console used by the user who is permitted to access the server 1, and the setting to not receive the operation data from the console used by the user who is not permitted to access the server 1 (see steps S20 and S22). It is therefore possible to prevent leakage of information.

Alternatively, a recording medium having the software program for realizing the functions of the server recorded thereon may be provided to each server, and the CPU 11 may read and execute the program recorded on the recording medium. In this manner, the same effects as those of the above described embodiment can also be achieved. The recording medium for supplying the program may be a CD-ROM, a DVD, a SD card, or the like.

Also, the CPU 11 of each server may execute the software program for realizing the functions of each PC. In this manner, the same effects as those of the above described exemplary embodiment can also be achieved.

Also, the main microcomputer 21 of the KVM switch 20 may execute the software program (e.g. driver software) for realizing the functions of the KVM switch 20. In this manner, the same effects as those of the above described exemplary embodiment can also be achieved.

For example, a storing portion recited in claim 1 corresponds to the storage medium 25. An acquiring portion and a controlling portion recited in claim 1 and an informing portion recited in claim 2 correspond to the main microcomputer 21. For example, a first interface recited in claim 4 corresponds to the I/F 26, and a second interface recited in claim 4 corresponds to the I/F 27. For example, an acquiring portion and a controlling portion recited in claim 7 and an informing portion recited in claim 8 correspond to the CPU 11, and a storing portion recited in claim 7 corresponds to the registry 18. For example, a first interface recited in claim 10 corresponds to the I/F 15a, and a second interface recited in claim 10 corresponds to the I/F 15b.

It should be understood that the present invention is not limited to the above described exemplary embodiment, and various modifications may be made to them without departing from the scope of the invention.

What is claimed is:

1. A KVM switch connectable to a plurality of information processing apparatus and at least one console used for operating the plurality of information processing apparatus, comprising:

a storing medium that stores first user-limiting information which defines, for each user, which information processing apparatus a user is permitted to access or not permitted to access; and a processor, the processor operating as:

an acquiring portion that acquires, from an information processing apparatus to which a user is seeking access, second user-limiting information which defines a list of users who are limited or not limited to access the information processing apparatus; and user identification information that identifies the user seeking access to the information processing apparatus; and a controlling portion that determines whether to permit access by the user to the information processing apparatus or not based on the first user-limiting information stored in the storing medium, the acquired second user-limiting information, and the user identification information, by comparing the user identification information to both of the first user-limiting information and the second user-limiting information.

2. The KVM switch as claimed in claim 1, further comprising an informing portion that informs a user to whom access to an information processing apparatus is limited by the controlling portion of information which shows that the access to the information processing apparatus to which the user is seeking the access is limited.

3. The KVM switch as claimed in claim 1, wherein the controlling portion performs a setting to receive operation data from the console used by the user who is permitted to access the information processing apparatus, and a setting to not receive the operation data from the console used by a user who is not permitted to access the information processing apparatus.

4. The KVM switch as claimed in claim 1, further comprising a first interface that is connected to each information processing apparatus and is used to communicate data for the console, and a second interface that is used to communicate a command of an application included in each information processing apparatus,
wherein each information processing apparatus includes a driver program for transmitting the second user-limiting information to the KVM switch via the first interface or the second interface.

5. The KVM switch as claimed in claim 1, wherein the first user-limiting information is capable of being set from the console or the information processing apparatus connected via a network.

6. A non-transitory computer readable recording medium storing a program causing a KVM switch to execute a process, the KVM switch being connectable to a plurality of information processing apparatus and at least one console used for operating the plurality of information processing apparatus, the process comprising:
acquiring, from an information processing apparatus to which a user is seeking access, second user-limiting information which defines a list of users who are limited or not limited to access the information processing apparatus, and user identification information that identifies the user seeking the access to the information processing apparatus; and
determining whether to permit access by the user to the information processing apparatus or not based on first user-limiting information stored in a storing medium of the KVM switch which defines, for each user, which information processing apparatus the corresponding user is permitted or not permitted to access, the acquired second user-limiting information, and the user identification information, by comparing the user identification information to both of the first user-limiting information and the second user-limiting information.

7. An information processing apparatus which is connected to a KVM switch connectable to at least one console, comprising:
a storing medium that stores second user-limiting information which defines, for each information processing apparatus connected to the KVM switch, a user who is limited or not limited to access the information processing apparatus;
a processor, the processor operating as:
an acquiring portion that acquires, from the KVM switch, first user-limiting information which defines, for each user, which information processing apparatus the corresponding user is permitted or not permitted to access, and user identification information that identifies the user seeking access to the information processing apparatus, through the KVM switch, from a console which the user is using; and
a controlling portion that determines whether to permit or not access to the information processing apparatus by the user seeking access based on the acquired user identification information, the first user-limiting information, and the second user-limiting information stored in the storing medium, by comparing the user identification information to both of the first user-limiting information and the second user-limiting information.

8. The information processing apparatus as claimed in claim 7, further comprising an informing portion that informs a user to whom access to an information processing apparatus is limited by the controlling portion of information which shows that the access to the information processing apparatus to which the user is seeking the access is limited.

9. The information processing apparatus as claimed in claim 7, wherein the controlling portion performs a setting to receive operation data from the console used by the user who is permitted to access the information processing apparatus, and a setting to not receive the operation data from the console used by the user who is not permitted to access the information processing apparatus.

10. The information processing apparatus as claimed in claim 7, further comprising a first interface that is connected to the KVM switch and is used to communicate data for the console, and a second interface that is used to communicate a command of an application included in the information processing apparatus,
wherein the acquiring portion that acquires the first user-limiting information via the first interface or the second interface.

11. A non-transitory computer readable recording medium storing a program causing an information processing apparatus to execute a process, the information processing apparatus being connected to a KVM switch connectable to at least one console, the process comprising:
acquiring, from the KVM switch, first user-limiting information which defines, for each user, which information processing apparatus the corresponding user is permitted or not permitted to access, and user identification information that identifies the user seeking access to the information processing apparatus, through the KVM switch, from a console which the user is using;
reading out second user-limiting information stored in a storing medium of the information processing apparatus that defines, for each information processing apparatus connected to the KVM switch, a user who is limited or not limited to access the information processing apparatus; and
determining whether to permit or not access to the information processing apparatus by the user seeking access based on the acquired user identification information, the first user-limiting information, and the second user-limiting information stored in the storing medium, by comparing the user identification information to both of the first user-limiting information and the second user-limiting information.

12. The KVM switch as claimed in claim 1, wherein the acquiring portion acquires the second user-limiting information from an information processing apparatus to which a user is seeking access and identification information for identifying the user seeking the access, and
the controlling portion determines whether to permit access by the user to the information processing apparatus to which the user seeking access, based on the stored first user-limiting information, the acquired second user-limiting information, and the acquired identification information.

13. The information processing apparatus as claimed in claim 7, wherein the acquiring portion acquires the first user-limiting information from the KVM switch when a user is seeking access to the information processing apparatus and identification information for identifying the user seeking the access, and the controlling portion determines whether to permit access by the user seeking access to the information processing apparatus based on the acquired first user-limiting information, the acquired identification information, and the stored user-limiting information.

14. The KVM switch as claimed in claim 1, wherein the controlling portion determines whether to permit the access by the user by:

determining whether the user specified by the identification information is permitted to access the information processing apparatus to which the user is seeking access based on the first user-limiting information, and determining whether the user specified by the acquired identification information is defined as a user who is not limited to access the information processing apparatus based on the second user-limiting information.

* * * * *